US008474518B2

(12) United States Patent
Goto et al.

(10) Patent No.: US 8,474,518 B2
(45) Date of Patent: Jul. 2, 2013

(54) AUTOMOBILE COOLING SYSTEM COMPONENT

(75) Inventors: Shinya Goto, Anjo (JP); Takahiko Nagaya, Gifu (JP); Masahiro Nozaki, Utsunomiya (JP)

(73) Assignee: Denso Corporation, Kariya (JP)

( * ) Notice: Subject to any disclaimer, the term of this patent is extended or adjusted under 35 U.S.C. 154(b) by 816 days.

(21) Appl. No.: 12/531,435

(22) PCT Filed: Mar. 19, 2008

(86) PCT No.: PCT/JP2008/055800
§ 371 (c)(1),
(2), (4) Date: Jan. 5, 2010

(87) PCT Pub. No.: WO2008/123327
PCT Pub. Date: Oct. 16, 2008

(65) Prior Publication Data
US 2010/0116482 A1    May 13, 2010

(30) Foreign Application Priority Data
Mar. 19, 2007    (JP) .................... 2007-070931

(51) Int. Cl.
*F28F 9/02*    (2006.01)
(52) U.S. Cl.
USPC ............................. 165/173; 165/42
(58) Field of Classification Search
USPC ............... 165/42, 148, 153, 173, 174, 175, 165/176
See application file for complete search history.

(56) References Cited

U.S. PATENT DOCUMENTS

| 5,017,652 | A |   | 5/1991  | Abe et al. |
|-----------|---|---|---------|------------|
| 5,162,447 | A |   | 11/1992 | Abe et al. |
| 6,082,439 | A | * | 7/2000  | Kato et al. ................ 165/79 |
| 7,389,584 | B2 |  | 6/2008  | Ringholz |
| 7,939,151 | B2 |  | 5/2011  | Kuhmann et al. |
| 2004/0102559 | A1 | * | 5/2004 | Oyamada et al. ............ 524/445 |
| 2007/0034365 | A1 |  | 2/2007 | Ringholz |
| 2007/0148388 | A1 |  | 6/2007 | Kuhmann et al. |

FOREIGN PATENT DOCUMENTS

| DE | 103 52 319 A1 | 6/2004 |
|----|---------------|--------|
| DE | 10 2004 019 769 | 11/2005 |
| DE | 10 2004 036 179 | 3/2006 |
| JP | 60-171133 | 9/1985 |

(Continued)

OTHER PUBLICATIONS

Office action dated Sep. 21, 2010 in corresponding Japanese Application No. 2008-070889.

(Continued)

*Primary Examiner* — Teresa Walberg
(74) *Attorney, Agent, or Firm* — Harness, Dickey & Pierce, PLC

(57) ABSTRACT

A tank body 125 comprising header tanks 120 of a radiator is composed with a polyamide composition containing polyamide 6,10, glass fiber, copper and nucleating agent. At this time, the polyamide composition contains, based on the total weight of the polyamide 6,10, the glass fiber, the copper and the nucleating agent, (a) 48.9 to 79.988 percent by weight of the polyamide 6,10, (b) 20 to 50 percent by weight of the glass fiber, (c) 0.002 to 0.1 percent by weight of the copper, and (d) 0.01 to 1.5 percent by weight of the nucleating agent, and the result of measuring half-crystallization time of the polyamide composition is 5 minutes or less. In addition, the polyamide 6,10 used has a relative viscosity, as measured in 98 percent sulfuric acid, of 2.3 to 2.9.

15 Claims, 3 Drawing Sheets

FOREIGN PATENT DOCUMENTS

| | | |
|---|---|---|
| JP | 63-207823 | 8/1988 |
| JP | 64-075527 | 3/1989 |
| JP | 9-176484 | 7/1997 |
| JP | 10-219107 | 8/1998 |
| JP | 2003-238697 | 8/2003 |
| JP | 2003-277604 | 10/2003 |
| JP | 2004-068740 | 3/2004 |
| JP | 2005-090863 | 4/2005 |
| JP | 2006-036824 | 2/2006 |
| JP | 2006-162194 A | 6/2006 |
| JP | 2006-291118 A | 10/2006 |

OTHER PUBLICATIONS

Office action dated Nov. 7, 2011 in corresponding Chinese Application No. 2008 80008960.5.

Office Action mailed Nov. 23, 2012 in corresponding German patent application No. 11 2008 000 700.4 with English translation thereof.

Office Action mailed Jan. 9, 2007 in corresponding German patent application No. 11 2008 000 700.4 with English translation thereof.

* cited by examiner

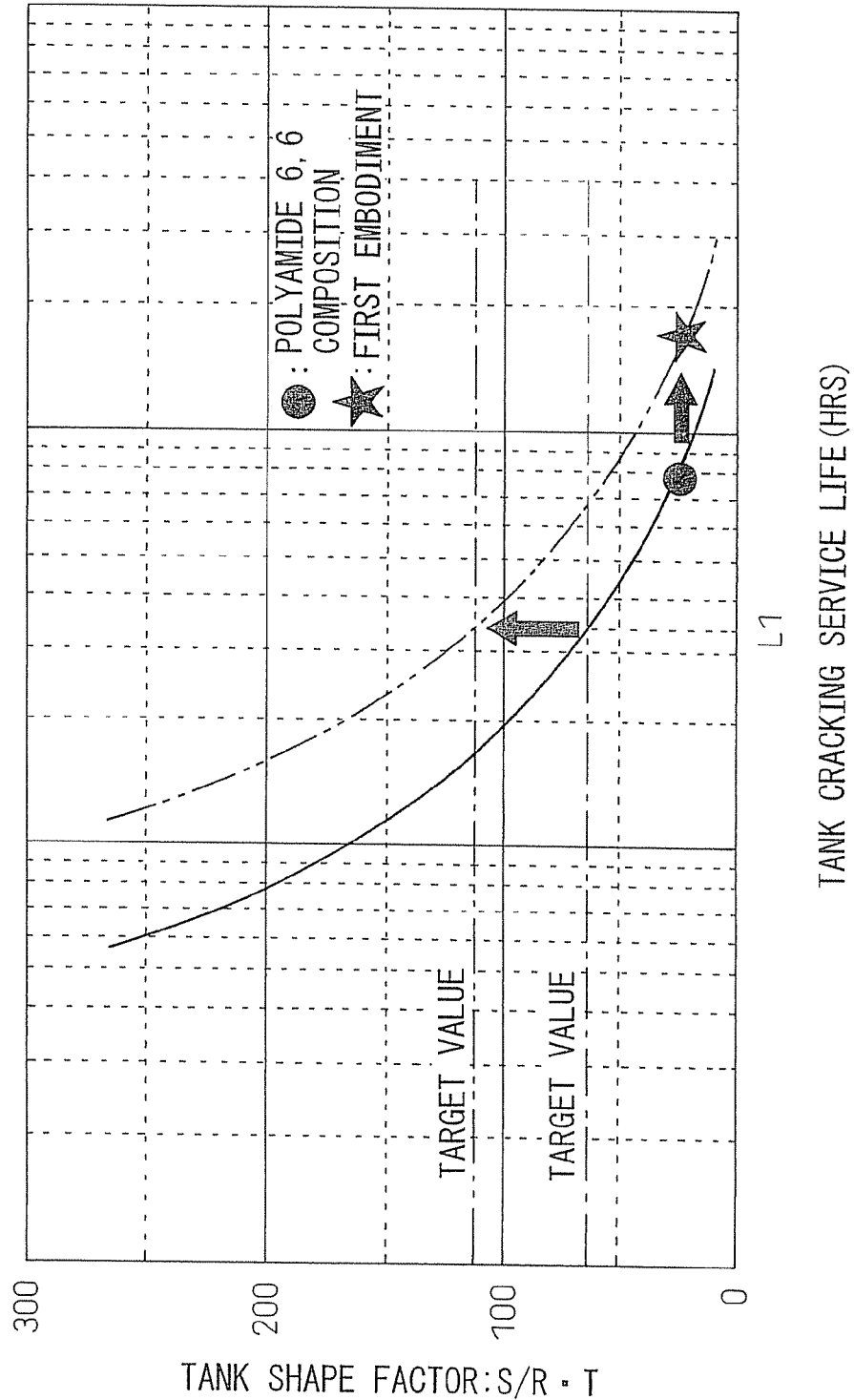

AUTOMOBILE COOLING SYSTEM COMPONENT

CROSS-REFERENCE TO RELATED APPLICATIONS

This application is a 371 U.S. National Stage of International Application No. PCT/JP2008/055800, filed Mar. 19, 2008, which claims the benefit of Japanese Patent Application No. JP 2007-070931, filed Mar. 19, 2007, the disclosures of which. applications are incorporated herein by reference.

TECHNICAL FIELD

The present invention relates to an automobile cooling system component exemplified by, for example, a radiator, reserve tank, heater core, heat storage tank, water valve or water pump.

BACKGROUND ART

Plastic components used in automobile cooling systems through which an engine cooling fluid flows are required to use a plastic having satisfactory productivity, resistance to hydrolysis, satisfactory resistance to calcium chloride with respect to cracks caused by exposure to calcium chloride, and satisfactory toughness and the like.

Therefore, in the prior art, glass-reinforced polyamide 6,6 compositions reinforced with glass fiber, and glass-reinforced polyamide compositions containing a blend of polyamide 6,6 and polyamide 6,12, having better resistance to cracking caused by exposure to calcium chloride, for example, have been used to produce automobile cooling system components.

On the other hand, Japanese Unexamined Patent Publication No. 10-219107 describes a plastic used for the purpose of use in fields such as automobile and mechanical components, and more specifically, a glass-reinforced polyamide composition that uses various polyamide resins which are usually used as engineering plastics.

Incidentally, engine cooling fluids are being expected to function at higher temperatures in response to a demand for automobiles having better fuel efficiency. However, in automobile cooling system components in which glass-reinforced polyamide compositions are used, rises in temperature of the engine cooling fluid can accelerate the rate of deterioration of the polyamide composition due to hydrolysis, thereby requiring a higher resistance to hydrolysis than in the prior art. In addition, long-term exposure of polyamide compositions to high-temperature fluid can lead to creep and other undesirable deformations of automobile cooling system components, thereby resulting in the need for higher levels of toughness and resistance to high-temperature creep than in the prior art.

SUMMARY OF INVENTIONS

Therefore, the inventors of the present application examined the composing of an automobile cooling system component with a glass-reinforced polyamide composition containing polyamide 6,10.

However, according to the results of studies conducted by the inventors of the present application, in the case of simply composing an automobile cooling system component with a glass-reinforced polyamide composition using polyamide 6,10 for engineering plastics applications as described in Japanese Unexamined Patent Publication No. 10-219107, the level of performance required by automobile cooling system components was found to not be satisfied.

With the foregoing in view, an object of the present invention is to provide an automobile cooling system component comprising a polyamide 6,10 composition having satisfactory productivity, resistance to calcium chloride, resistance to hydrolysis, toughness and resistance to high-temperature creep.

In order to achieve the aforementioned object, the present invention provides, in a first aspect thereof, an automobile cooling system component comprising a polyamide composition containing polyamide 6,10, glass fiber, copper and at least one type of nucleating agent;
wherein the polyamide composition contains, based on the total weight of the polyamide 6,10, the glass fiber, the copper and the nucleating agent,
(a) 48.9 to 79.988 percent by weight of the polyamide 6,10,
(b) 20 to 50 percent by weight of the glass fiber,
(c) 0.002 to 0.1 percent by weight of the copper, and
(d) 0.01 to 1.5 percent by weight of the nucleating agent, the half-crystallization time of the polyamide composition is 5 minutes or less, and
the polyamide 6,10 used has a relative viscosity, as measured in 98 percent sulfuric acid, of 2.3 to 2.9.

As a result of being comprised of such a polyamide 6,10 composition, an automobile cooling system component can be provided that has satisfactory productivity, resistance to calcium chloride, resistance to hydrolysis, toughness and resistance to high-temperature creep.

In addition, according to the present invention, since a polyamide 6,10 having a relative viscosity of 2.3 to 2.9 and a half-crystallization time of 5 minutes or less is used for the polyamide 6,10 in the polyamide composition, in comparison with the case of using ordinary polyamide 6,10 for engineering plastics applications, an automobile cooling system component can be provided that has high productivity, toughness and resistance to high-temperature creep.

In the present invention, examples of nucleating agents that can be used include carbon black and talc. In addition, examples of copper that can be used include monovalent copper compounds and divalent copper compounds.

In addition, the present invention can be applied to a component used in an automobile cooling system that serves as at least a portion of a tank through which engine cooling water circulates.

In addition, the present invention can be applied to, for example, a radiator, heater core, reserve tank, heat storage tank, water valve or water pump, and can also be applied to components composing a portion thereof. For example, the present invention can also be applied to a radiator tank or a radiator cap that composes a portion thereof.

In addition, in the automobile cooling system component of the present invention, the cross-sectional shape of a portion through which fluid circulates, for example, has a pair of mutually opposing sidewalls (131, 132), and a bottom (133) that joins the pair of sidewalls (131, 132) by being connected to the pair of sidewalls (131, 132) through connections (134, 135) curved at a prescribed radius of curvature, and the shape factor S/RT of the portion through which a fluid circulates, when the radius of curvature, the plate thickness and the cross-sectional area of the flow path are taken to be R, T and S, respectively, is preferably 110 or less.

As a result thereof, the service life of an automobile cooling system component comprising the polyamide composition can be improved to a greater extent than plastic automobile cooling system components of the prior art.

In addition, the present invention provides, in a second aspect thereof, a heat exchanger for dissipating heat from a fluid that cools an exothermic body; comprising:

a plurality of tubes (111) through which a fluid circulates, and header tanks (120) arranged on both ends in the lengthwise direction of the tubes (111) that communicate with the plurality of tubes (111) by extending in a direction perpendicular to the lengthwise direction of the tubes (111), and the header tanks (120) have a core plate (123) to which the plurality of tubes (111) are joined, and a plastic tank body (125) composing a tank internal space (124) along with the core plate (123) and, wherein the tank body (125) is composed of a polyamide composition containing polyamide 6,10, glass fiber, copper and at least one type of nucleating agent, the polyamide composition contains, based on the total weight of the polyamide 6,10, the glass fiber, the copper and the nucleating agent, (a) 48.9 to 79.988 percent by weight of the polyamide 6,10,
(b) 20 to 50 percent by weight of the glass fiber,
(c) 0.002 to 0.1 percent by weight of the copper, and
(d) 0.01 to 1.5 percent by weight of the nucleating agent, the half-crystallization time of the polyamide composition is 5 minutes or less, and the polyamide 6,10 used has a relative viscosity, as measured in 98 percent sulfuric acid, of 2.3 to 2.9.

In addition, in this case, the cross-sectional shape of the tank body (125) has a pair of mutually opposing sidewalls (131, 132), and a bottom (133) that joins the pair of sidewalls (131, 132) by being connected to the pair of sidewalls (131, 132) through connections (134, 135) curved at a prescribed radius of curvature, and the shape factor S/RT of the tank body (125), when the radius of curvature of the portion through which the fluid circulates, the plate and the cross-sectional area of the flow path are taken to be R, T and S, respectively, is preferably 110 or less.

Furthermore, the reference symbols in parentheses for each of the means described in the claims and this section are examples indicating a corresponding relationship with specific means described in the embodiments to be described later.

BRIEF DESCRIPTION OF THE DRAWINGS

FIG. 3 shows a graph showing the relationship between tank shape factor and tank cracking service life in the tank body shown in FIG. 2.

DETAILED DESCRIPTION

First Embodiment

Figure 1:
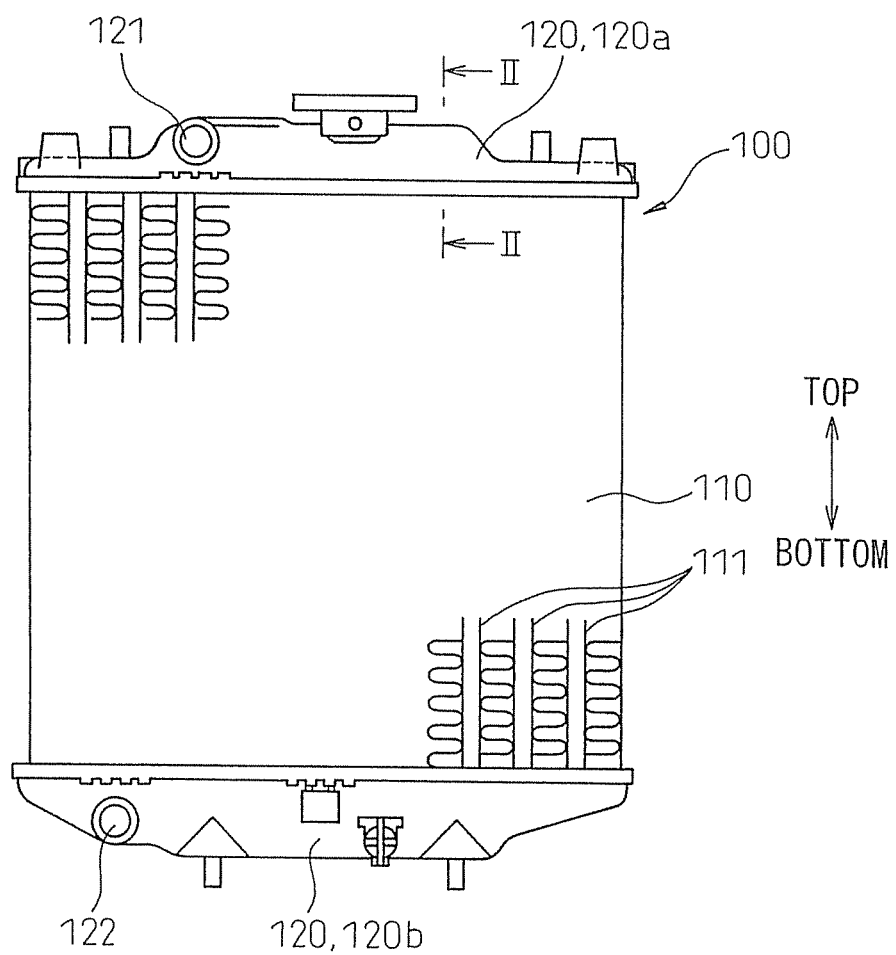
FIG. 1 shows a front view of a radiator 100 in a first embodiment of the present invention.
Figure 2:
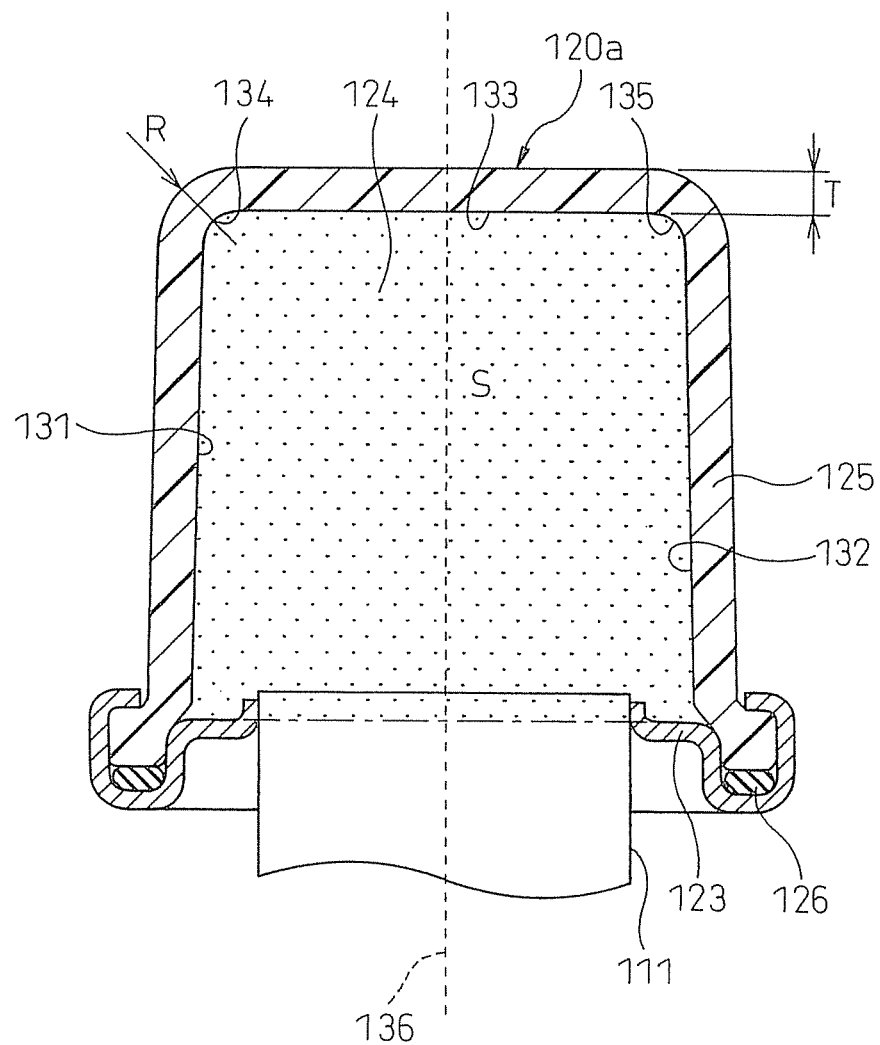
FIG. 2 shows a cross-sectional view taken along line II-II in FIG. 1.

The present embodiment is an example of the automobile cooling system component as claimed in the present invention serving as a portion of a radiator for dissipating heat from a cooling fluid used to cool an exothermic body in the form of an engine during vehicle operation. FIG. 1 shows a front view of the radiator in the first embodiment of the present invention, while FIG. 2 shows a cross-sectional view taken along line II-II in FIG. 1.

A radiator 100 of the present embodiment is that which carries out heat exchange between a cooling fluid in the form of water and air, and as shown in FIG. 1, is provided with a plurality of tubes 111, through which cooling water circulates, and header tanks 120, arranged on both ends in the lengthwise direction of tubes 111, which communicate with the plurality of tubes 111 by extending in a direction perpendicular to the lengthwise direction of tubes 111.

The tubes 111 are arranged in rows so that the lengthwise direction thereof coincides with the vertical direction. In addition, fins 112 in the shape of thin strips having a corrugated form are arranged between the plurality of tubes 111, and fins 112 and tubes 111 are joined. Fins 112 and tubes 111 are made of a metal such as aluminum, and are joined by brazing. A core portion 110 for exchanging heat between cooling water and air is composed by these fins 112 and tubes 111.

The header tanks 120 are composed of a first header tank 120a arranged on the upper side of tubes 111, and a second header tank 120b arranged on the lower side of tubes 111, and the first header tank 120a and the second header tank 120b have a shape that extends in the horizontal direction.

An inlet portion 121 into which cooling water flows is provided in the first header tank 120a, and an outlet section 122 from which cooling water flows out is provided in the second header tank 120b. Cooling water at a high temperature that has flown out of the engine flows into the first header tank 120a from the inlet portion 121, and is then distributed among each tube 111. Cooling water at a low temperature that has finished undergoing heat exchange is collected in the second header tank 120b and is then returned to the engine side from the outlet portion 122.

As shown in FIG. 2, the first header tank 120a is composed to have a core plate 123 to which the plurality of tubes 111 are connected, and a tank body 125 that composes a tank inner space 124 along with the core plate 123. Furthermore, the second header tank 120b is also composed in the same manner as the first header tank 120a.

The tank body 125 has a first wall portion 131 and a second wall portion 132, the cross-sectional shapes of which compose two mutually opposing, parallel sides, and a third wall portion 133 connected to the two sides and composes a side perpendicular to the two sides, and connections 134 and 135 thereof have a shape curved at a prescribed radius of curvature R. In other words, the tank body 125 has a cross-sectional shape in which a U-shaped bottom 133 is flat instead of circular. As shown in FIG. 2, the tank body 125 of the present embodiment has the same length as the first side portion 131 and the second side portion 132, and when a virtual line 136 perpendicular to the third wall portion 133 is drawn through the center of the third wall portion 133, the shape of the tank body 125 is laterally symmetrical with respect to this virtual line 136. In addition, a plate thickness T of the portion composing the cooling water flow paths of the first to third wall portions 131 to 133 is constant. Furthermore, in the present embodiment, the first wall portion 131 and the second wall portion 132 compose a pair of mutually opposing sidewall portions, while the third wall portion 133 composes a bottom portion that joins the pair of sidewall portions by being connected to the pair of sidewall portions through the connections 134 and 135.

The tank body 125 is made of plastic composed of a glass-reinforced polyamide composition, and the core plate 123 is made of a metal such as aluminum. The core plate 123 and the tank body 125 are caulked in position with a rubber packing 126 interposed there between, and core plate 123 and the tubes 111 are fastened by, for example, welding or brazing.

The polyamide resin that composes the tank body 125 contains polyamide 6,10, glass fiber, copper and a nucleating agent. Furthermore, polyamide 6,10 refers to poly(hexamethylenesebacamide).

The polyamide 6,10 used in this polyamide composition differs from conventional polyamide 6,10 used in other applications in that, as will be understood from the examples described later, it has a higher molecular weight than the conventional polyamide, and the relative viscosity as measured in 98 percent sulfuric acid is 2.3 to 2.9.

In addition, the glass fiber has a mean fiber diameter of, for example, 5 to 15 μm, there are no particular limitations on the fiber length, and glass fibers of various fiber lengths can be used within a range that allows molding of the tank body 125.

The copper functions as a heat stabilizer, and in the production of the polyamide composition, a copper compound such as a halogen compound is used. A monovalent copper compound, divalent copper compound or both may be employed for the copper compound.

Examples of the monovalent copper include cuprous iodide, cuprous bromide, cuprous chloride, cuprous fluoride, cuprous thiocyanurate, cuprous nitrate, cuprous acetate, cuprous naphthalene, cuprous caproate, cuprous laurate, cuprous stearate, cuprous acetylacetate, cuprous oxide and the like. Copper iodides are preferable for the copper compounds, and copper(I) iodide is particularly preferable.

In addition, the following additives may be added to the polyamide composition in addition to the copper compound. Examples of the additives include a metal halide salt selected from lithium iodide, sodium iodide, magnesium iodide, potassium bromide and calcium iodide. The content of the additive is preferably 0.01 to 5.0 percent by weight.

The nucleating agent has a function of promoting crystallization of the polyamide 6,10 during production of the polyamide composition, and in the present embodiment is used to adjust the half-crystallization time, which is one of the parameters used to evaluate the molded polyamide composition, to 5 minutes or less. Examples of the nucleating agent that can be used include carbon black, an inorganic-type substance and an organic-type substance. Examples of the inorganic-type substance include talc, kaolin, boron nitride, silica alumina, etc., and examples of the organic-type substance include an organic phosphorus compound, such as phenylphosphinic acid and metal phenylphosphinate and a nylon oligomer. Carbon black alone or talc added to carbon black is preferably used for the nucleating agent. In this manner, although a plurality of nucleating agents may be used, at least one type of a nucleating agent must be used.

In addition, when carbon black is used, the carbon black having an average diameter of 10 to 100 nm is preferably used. When talc is used, talc having an average diameter of 1 to 10 μm is preferably used. The average diameter of carbon black is measured based on ASTM D-3849, and the average diameter of talc is measured by laser light diffraction.

The polyamide composition of the present embodiment contains: (a) 48.9 to 78.988 percent by weight of the polyamide 6,10, (b) 20 to 50 percent by weight, preferably 25 to 40 percent by weight of the glass fiber, (c) 0.002 to 0.1 percent by weight, preferably 0.005 to 0.032 percent by weight of the copper, and (d) 0.01 to 1.5 percent by weight, preferably 0.1 to 1.0 percent by weight of the nucleating agent, based on the total weight of the polyamide 6,10, glass fiber, copper and nucleating agent. Furthermore, with respect to copper, the total weight is based on only the amount of copper present in the polyamide composition, and the percent by weight of the copper indicates the percentage of copper only and not copper compounds.

Furthermore, additives other than the aforementioned additives may be added to the polyamide compositions of the present embodiment. For example, a lubricant, plasticizer, antioxidant, ultraviolet stabilizer, impact resistance-imparting agent, inorganic filler or fiber reinforcing agent other than glass fiber may added to the polyamide compositions. Typical examples of the lubricant include metal salt of fatty acid, fatty acid, fatty acid ester, fatty acid ether, glycerin ester, organic mono- or bis-amide compound, oxidized or non-oxidized polyethylene wax, and a mixture thereof.

In addition, as an example of the dimensions of the tank body 125 of the present embodiment, the tank body 125 can have an inner surface area S of 1145 mm$^2$, a plate thickness T of 3.3 mm and a radius of curvature R of 12 mm as shown in FIG. 2. This inner surface area S refers to the cross-sectional area of the flow path of cooling water flowing through the header tanks 120, while the plate thickness T is the thickness of the portion that comprises the cooling water flow path of the tank body 125.

At this time, a tank shape factor $S/(T \cdot R)$, as indicated by using the inner surface area S, plate thickness T and radius of curvature R, is such that $S/(T \cdot R)=1145/(3.3\times12)=28.9$.

The relationship between the tank shape factor and tank cracking service life of the tank body 125 of the present embodiment is shown in FIG. 3. In FIG. 3, the aforementioned tank shape factor $S/(T \cdot R)$ is plotted on the vertical axis, while tank cracking service life is plotted on the horizontal axis. This tank cracking service life is determined by measuring the amount of time until cracking of the tank body 125 occurs when long life coolant (LLC) at a concentration of 50% is sealed at an atmosphere of 130° C. in various shapes of tank body 125.

In the case of the tank body 125 of the present embodiment, the tank cracking service life when the tank shape factor is 28.9 has the duration indicated with the star in FIG. 3, and can be seen to be longer than the tank cracking service life of a tank body composed of a glass-reinforced polyamide 6,6 composition of the prior art having the same tank shape factor, as indicated with the black dot in FIG. 3.

In addition, as a result of investigating the relationship between tank shape factor and tank cracking service life when changing the radius of curvature R, plate thickness T and inner surface area S of the tank body 125 of the present embodiment, it was determined that in contrast to obtaining the relationship of the curve indicated with the solid line in FIG. 3 in the case of a tank body comprised of a glass-reinforced polyamide 6,6 composition of the prior art, the relationship of the curve indicated with the double-dotted broken line in FIG. 3 was obtained in the case of the tank body 125 comprised of the glass-reinforced polyamide 6,10 composition of the present embodiment.

As can be seen from these results, in the case of a tank body comprised of a glass-reinforced polyamide 6,6 composition of the prior art, the tank shape factor was set to 60 or less (refer to the straight line indicated with the single-dotted broken line in FIG. 3) so that the tank cracking service life is longer than the tank cracking service life L1 required by radiator header tanks. In contrast, in the tank body 125 of the present embodiment, the tank shape factor can be seen to be required to be set to 110 or less in order to make the cracking service life longer than tank cracking service life L1 (refer to the straight line indicated with the double-dotted broken line in FIG. 3). Thus, it is preferable to set the tank shape factor to 110 or less in the present embodiment.

As has been described above, the tank body 125 having the aforementioned configuration can be produced using a production process similar to the case of using a glass-reinforced polyamide 6,6 composition of the prior art, with the exception of using polyamide 6,10 having a degree of polymerization such that the relative viscosity thereof is 2.3 to 2.9. The polyamide 6,10 composition of the present embodiment is a molten mixed blend, and the polyamide 6,10 composition can be adjusted using various melt blending methods.

For example, a polymer component and a non-polymer component may be added to a melting mixer such as a single screw or twin screw extruder, blender, kneader or Banbury mixer either in a single step or in a stepwise manner, and followed by melting and mixing. In the case the polymer component and the non-polymer component are added in a stepwise manner, a portion of the polymer component and/or non-polymer component may be added first followed by mixing and melting with the remaining polymer component and/or non-polymer component added, and then further melting and mixing until an adequately mixed composition is obtained. This mixture can then be molded into the shape of the tank body 125 using a method known among persons with ordinary skill in the art such as injection molding, injection blow molding, blow molding, extrusion, thermoforming, melt casting or rotational molding.

As has been explained above, in the present embodiment, since the tank body 125 is composed with a polyamide 6,10 composition having the configuration described above, a plastic tank body 125 can be provided having satisfactory productivity, calcium chloride resistance, hydrolysis resistance, toughness and high-temperature creep resistance.

In addition, as a result of composing the tank body 125 with the polyamide 6,10 composition configured in the manner described above, hydrolysis resistance, toughness and high-temperature creep resistance can be improved as compared with conventional tank bodies composed of a polyamide 6,6 composition and the like, thereby making it possible to provide a plastic tank body 125 capable of being used even in cases of an engine cooling fluid that operates at a higher temperature than the prior art in response to demand for automobiles having better fuel efficiency.

Other Embodiments

Although the embodiment described above is a radiator having corrugated fins 112, the present invention is not limited thereto, but rather can also be applied to, for example, a radiator in which fins in the shape of thin strips and tubes are joined mechanically by expanding the tubes.

In addition, although tubes 111 were arranged so that the lengthwise direction thereof coincided with the vertical direction in the embodiment described above, the present invention is not limited thereto, but rather the lengthwise direction of the tubes 111 may also coincide with the horizontal direction, for example.

In addition, although the tank body 125 was composed with the polyamide 6,10 composition having the aforementioned configuration in the embodiment described above, a radiator cap may also be composed with the polyamide 6,10 composition having the aforementioned configuration. In other words, at least a portion of the radiator can be composed with the polyamide 6,10 composition having the aforementioned configuration.

In addition, although the automobile cooling system component as claimed in the present invention served as a tank body of a vehicle radiator in the embodiment described above, this component is not limited to a heat exchanger for cooling a high-temperature fluid in the manner of a radiator, but rather may serve as a reserve tank, heater core, heat storage tank, water valve, water pump and the like through which a high-temperature fluid such as an engine cooling fluid flows, or may serve as a portion of a reserve tank, a portion of a heater core, a portion of a heat storage tank, a portion of a water valve, a portion of a water pump and the like.

In this case, the cross-sectional shape of the portion through which the fluid circulates at least has a pair of mutually opposing sidewalls, and a bottom that joins the pair of sidewalls by being connected to the pair of sidewalls through connections curved at a prescribed radius of curvature, and the shape factor S/RT of the portion through which the fluid circulates, when the radius of curvature, the plate thickness and the cross-sectional area of the flow path are taken to be R, T and S, respectively, is equivalent to the tank shape factor explained in the aforementioned embodiment, and is preferably 110 or less.

Furthermore, although the polyamide composition employed in the embodiment described above contains (a) 48.9 to 79.988 percent by weight of the polyamide 6,10, (b) 20 to 50 percent by weight of the glass fiber, (c) 0.002 to 0.1 percent by weight of the copper, (d) 0.01 to 1.5 percent by weight of the nucleating agent, based on the total weight of the polyamide 6,10, the glass fiber, the copper and the nucleating agent, the half-crystallization time of the polyamide composition is 5 minutes or less, and the polyamide 6,10 has a relative viscosity as measured in 98 percent sulfuric acid of 2.3 to 2.9, a blend of polyamide 6,10 and polyamide 6,12, or polyamide 6,12 may be used instead of polyamide 6,10 for the polyamide composition having such a configuration.

EXAMPLES

The following provides an explanation of examples of the polyamide 6,10 composition.

Table 1 shows the materials and amounts of components used in Examples 1 to 15 and Comparative examples 1 to 6. The amounts of components shown in Table 1 are indicated in percent by weight based on the total weight of the polyamide, glass fiber, carbon black and copper (Cu).

TABLE 1

|  | Ex. 1 | Comp. Ex. 1 | Comp. Ex. 2 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| PA 6, 10 | A | A | A | A | A | A | A | A | B | C | D |
| PA 6, 6 | — | — | — | — | — | — | — | — | — | — | — |
| PA 6, 6/6, 12 | — | — | — | — | — | — | — | — | — | — | — |
| Glass fiber | 25 | 33 | 33 | 33 | 33 | 33 | 33 | 40 | 33 | 33 | 33 |
| Carbon black | 0.25 | 0 | 0.25 | 0.25 | 0.25 | 0.25 | 0.25 | 0.25 | 0.25 | 0.25 | 0.25 |
| talc | 0 | 0 | 0 | 0 | 0 | 0 | 0 | 0 | 0 | 0 | 0 |
| Cu | 0.01 | 0.01 | 0 | 0.005 | 0.008 | 0.01 | 0.032 | 0.01 | 0.01 | 0.01 | 0.01 |

TABLE 1-continued

|   | Ex. 10 | Ex. 11 | Ex. 12 | Ex. 13 | Ex. 14 | Ex. 15 | Comp. Ex. 3 | Comp. Ex. 4 | Comp. Ex. 5 | Comp. Ex. 6 |
|---|---|---|---|---|---|---|---|---|---|---|
| PA 6,10 | E | A | A | A | A | C | — | — | — | A |
| PA 6, 6 | — | — | — | — | — | — | Y | Y | — | — |
| PA 6, 6/6, 12 | — | — | — | — | — | — | — | — | Y | — |
| Glass fiber | 33 | 33 | 33 | 33 | 33 | 33 | 25 | 33 | 33 | 33 |
| Carbon black | 0.25 | 0.01 | 1.0 | 0.25 | 0.25 | 0.25 | 0.02 | 0 | 0 | 0.25 |
| talc | 0 | 0 | 0 | 0 | 0.6 | 1.2 | 0.6 | 0 | 0 | 2 |
| Cu | 0.01 | 0.01 | 0.01 | 0.01 | 0.01 | 0.01 | 0.01 | 0.01 | 0 | 0.01 |

Sample Preparation: Compositions of the examples (referred to as the "Examples" in Table 1) and comparative examples (referred to as the "Comparative examples" in Table 1) were prepared by melting and blending the components indicated in Table 1 with a twin screw extruder. Copper was added in the form of CuI. The amounts shown in Table 1 are equivalent to the actual weight of copper present.

Five types of polyamide 6,10 having different relative viscosities (referred to as "A" through "E" in column of PA 6,10 in Table 1) were used in Examples 1 to 15 and Comparative examples 1 and 2. The relative viscosities thereof were as indicated below.
Polyamide 6,10A: 2.9
Polyamide 6,10B: 2.8
Polyamide 6,10C: 2.6
Polyamide 6,10D: 2.5
Polyamide 6,10E: 2.3

The results for relative viscosity were obtained by measuring at 25° C. in 98% sulfuric acid in accordance with JIS K9620. In addition, polyamide 6,6 (referred to as PA6,6 in Table 1) was used in Comparative examples 3, 4 and 6, while blend of polyamide 6,6 and polyamide 6,12 (referred to as PA 6,6/6,12 in Table 1) was used in Comparative example 5.

Table 2 shows the results of each test for Examples 1 to 15 and Comparative examples 1 to 6. The test methods were as described below.

TABLE 2

|  | Ex. 1 | Comp. Ex. 1 | Comp. Ex. 2 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Charpy impact strength | 12.3 | 15.1 | — | 14.8 | — | 14.6 | 14.3 | 18.2 | 14.3 | 13.6 | 13.2 |
| Tensile strength (MPa) | | | | | | | | | | | |
| 888 hours | 47 | 50 | 47 | 48 | 49 | 48 | 48 | 49 | 45 | 43 | 40 |
| 1800 hours | 24 | 35 | 24 | 25 | 27 | 26 | 26 | 27 | 25 | 25 | 25 |
| Strain resistance (%) | | | | | | | | | | | |
| 888 hours | 2.3 | 2.6 | 2.2 | 2.4 | 2.3 | 2.4 | 1.9 | 1.8 | 1.7 | 1.3 | 1 |
| 1800 hours | 0.5 | 0.8 | 0.5 | 0.5 | 0.5 | 0.5 | 0.5 | 0.5 | 0.5 | 0.5 | 0.4 |
| Air oven aging tensile strength retention rate (%) | — | — | 52 | 82 | 83 | 84 | 84 | — | — | — | — |
| Calcium chloride resistance (cycles) | >200 | — | — | — | — | >200 | — | >200 | — | — | >200 |
| Half-crystallization time (measuring condition 1) | — | — | >5 | — | — | 3.6 | — | — | — | — | — |
| Half-crystallization time (measuring condition 2) | — | — | — | — | — | — | — | — | — | — | — |

|  | Ex. 10 | Ex. 11 | Ex. 12 | Ex. 13 | Ex. 14 | Ex. 15 | Comp. Ex. 3 | Comp. Ex. 4 | Comp. Ex. 5 | Comp. Ex. 6 |
|---|---|---|---|---|---|---|---|---|---|---|
| Charpy impact strength | 12.1 | 14.8 | 12.7 | 12.8 | 12.5 | 12.7 | 8.7 | 10.5 | 11.4 | 11.4 |
| Tensile strength (MPa) | | | | | | | | | | |
| 888 hours | 40 | 49 | 46 | 46 | 48 | 46 | 15 | 14 | 19 | 46 |
| 1800 hours | 22 | 29 | 27 | 27 | 29 | 29 | 6 | 6 | 14 | 28 |
| Strain resistance (%) | | | | | | | | | | |
| 888 hours | 0.85 | 2.5 | 2.0 | 2.6 | 2.3 | 2.3 | 0.37 | 0.35 | 0.35 | 2.1 |
| 1800 hours | 0.25 | 0.6 | 0.4 | 0.5 | 0.5 | 0.4 | — | — | — | 0.4 |
| Air oven aging tensile strength retention rate (%) | — | — | — | — | — | — | 82 | 80 | 48 | 80 |
| Calcium chloride resistance (cycles) | — | — | >200 | — | >200 | >200 | 7 | 6 | 97 | 6 |
| Half-crystallization time (measuring condition 1) | — | 4.3 | 2.6 | — | — | — | 2 | — | — | — |
| Half-crystallization time (measuring condition 2) | — | — | — | 3.6 | 3.1 | 3.1 | — | — | — | 3.2 |

Charpy impact strength was measured based on ISO179 using test pieces having a notch.

Immersion test—Tensile strength: Samples were injection molded into a flat plate having dimensions of 120×140×2.5 mm, followed by mechanically forming into the shape of an ASTM No. 1 tensile test piece in the direction perpendicular to the direction in which the glass fibers are oriented from the center of the flat plate. The test pieces were then immersed in a 50/50 v/v mixture of water and Toyota genuine LLC at 130° C. for 888 hours or 1800 hours. The tensile strength of the test pieces was then measured.

Immersion test—Strain resistance: Samples were injection molded into a flat plate having dimensions of 120×140×2.5 mm, followed by mechanically forming into a flat plate having dimensions of 120×40×2.5 mm in the direction perpendicular to the direction in which the glass fibers are oriented from the center of the flat plate. The test pieces were then immersed in a 50/50 v/v mixture of water and Toyota genuine LLC at 130° C. for 888 hours or 1800 hours. Strain resistance was measured by bending the flat plate around a curved jig and measuring the percentage of strain at which cracks formed. A higher value suggests greater strain resistance.

Air oven aging (AOA) test: Samples were injection molded into a flat plate having dimensions of 120×140×2.5 mm, followed by mechanically forming into the shape of an ASTM No. 1 tensile test piece in the direction perpendicular to the direction in which the glass fibers are oriented from the center of the flat plate. The test pieces were then aged for 1000 hours at 160° C. in a drying oven, followed by measurement of the tensile strength thereof.

Calcium chloride resistance test: Samples were injection molded into a flat plate having dimensions of 120×140×2.5 mm, followed by mechanically forming into a flat plate having dimensions of 120×12.7×2.5 mm in the direction perpendicular to the direction in which the glass fibers are oriented from the center of the flat plate. The test pieces were adjusted to be in a water absorbing state having a relative humidity of 50% at 23° C. The test pieces were wrapped in a piece of gauze moistened adequately soaked with a 35% solution of calcium chloride, followed by suspending a weight from one end thereof so that the load was 20 MPa while fixing the other end and allowing to stand at room temperature for 1 hour. Continuing, the test pieces were placed in an over at 100° C. for 2 hours and then cooled for 1 hour at room temperature. This cycling was repeated until cracks were observed on the surface of the test piece.

Crystallization rate: Samples were heated to a temperature 40° C. higher than the melting point of the polymer at the rate of 20° C./minute, followed by cooling to a temperature 20° C. lower than the melting point thereof at the rate of 100° C./minute. Subsequently, the samples were allowed to crystallize while maintaining at that temperature. Half-crystallization time was measured to evaluate the polyamide compositions.

However, when the crystallization rate when cooling the sample to a temperature 20° C. lower than the melting point thereof at the rate of 100° C./miniue was too great, half-crystallization time during cooling the sample to a temperature 10° C. lower than the melting point thereof at the rate of 100° C./miniue was measured. In Table 2, the half-crystallization time obtained by cooling a sample to a temperature 20° C. lower than the melting point thereof is indicated in a column of measuring condition 1, and the half-crystallization time obtained by cooling a sample to a temperature 10° C. lower than the melting point thereof is indicated in the column of measuring condition 2.

As shown in Table 2, in a comparison of the test results for tensile strength and strain resistance between Examples 1 to 15 and Comparative examples 3 to 6, the results for Examples 1 to 15 were greater than Comparative examples 3 to 6. As a result, the polyamide composition of the present examples can be said to have a higher toughness and higher-temperature creep resistance than a composition using polyamide 6,6, when the relative viscosity of the polyamide 6,10 is as indicated for A to E.

In addition, by comparing the results of Examples 1 to 15, there appears to be a tendency that the polyamide 6,10 with lower relative viscosity (see polyamides 6,10 A to E in Table 1) has lower strain resistance. Furthermore, polyamide 6,10 with a relative viscosity of 2.3 or more is preferable, since the strain resistance in Example 10 was a minimum value required for automobile cooling system components (e.g., a tank body of a radiator).

In addition, as the nucleating agent, using carbon black and talc together is more preferable than using carbon black or talc solely, since the half-crystallization time in each of Examples 13 to 15 was shorter than in other Examples.

We claim:

1. An automobile cooling system component comprising a polyamide composition containing polyamide 6,10, glass fiber, a copper compound and at least one type of nucleating agent;
    wherein the polyamide composition contains, based on the total weight of the polyamide 6,10, the glass fiber, the copper and the nucleating agent,
    (a) 48.9 to 79.988 percent by weight of the polyamide 6,10,
    (b) 20 to 50 percent by weight of the glass fiber,
    (c) 0.002 to 0.1 percent by weight of the copper compound, and
    (d) 0.01 to 1.5 percent by weight of the nucleating agent,
    the half-crystallization time of the polyamide composition is 5 minutes or less,
    the polyamide 6,10 used has a relative viscosity, as measured in 98 percent sulfuric acid, of 2.3 to 2.9, and
    the polyamide composition contains, as a polyamide, only the polyamide 6,10.

2. The automobile cooling system component according to claim 1, wherein carbon black is used for the nucleating agent.

3. The automobile cooling system component according to claim 1, wherein talc is used for the nucleating agent.

4. The automobile cooling system component according to claim 1, wherein a monovalent copper compound is used for the copper compound.

5. The automobile cooling system component according to claim 1, wherein a divalent copper compound is used for the copper compound.

6. The automobile cooling system component according to claim 1, which serves as at least a portion of a tank, used in the automobile cooling system, through which engine cooling water is circulated.

7. The automobile cooling system component according to claim 1, which serves as at least a portion of a radiator used in the automobile cooling system.

8. The automobile cooling system component according to claim 1, which serves as at least a portion of a heater core used in the automobile cooling system.

9. The automobile cooling system component according to claim 1, which serves as at least a portion of a reserve tank used in the automobile cooling system.

10. The automobile cooling system component according to claim 1, which serves as at least a portion of a heat storage tank in the automobile cooling system.

11. The automobile cooling system component according to claim 1, which serves as at least a portion of a water valve used in the automobile cooling system.

12. The automobile cooling system component according to claim 1, which serves as at least a portion of a water pump used in the automobile cooling system.

13. The automobile cooling system component according to claim 1, wherein a cross-sectional shape of a portion through which a fluid circulates has a pair of mutually opposing sidewalls, and a bottom that joins the pair of sidewalls by being connected to the pair of sidewalls through connections curved at a prescribed radius of curvature, and a shape factor S/RT of the portion through which the fluid circulates, when the radius of curvature, a plate thickness and a cross-sectional area of a flow path are taken to be R, T and S, respectively, is 110 or less.

14. A heat exchanger for dissipating heat from a fluid that cools an exothermic body; comprising:

a plurality of tubes through which a fluid circulates, and header tanks arranged on both ends in the lengthwise direction of the tubes that communicate with the plurality of tubes by extending in a direction perpendicular to the lengthwise direction of the tubes, and the header tanks have a core plate to which the plurality of tubes are joined, and a plastic tank body composing a tank internal space along with the core plate; wherein, the tank body is composed of a polyamide composition containing polyamide 6,10, glass fiber, a copper compound and at least one type of nucleating agent, the polyamide composition contains, based on the total weight of the polyamide 6,10, the glass fiber, the copper and the nucleating agent, (a) 48.9 to 79.988 percent by weight of the polyamide 6,10,
(b) 20 to 50 percent by weight of the glass fiber,
(c) 0.002 to 0.1 percent by weight of the copper compound, and
(d) 0.01 to 1.5 percent by weight of the nucleating agent, the half-crystallization time of the polyamide composition is 5 minutes or less, the polyamide 6,10 used has a relative viscosity, as measured in 98 percent sulfuric acid, of 2.3 to 2.9, and the polyamide composition contains, as a polyamide, only the polyamide 6,10.

15. The heat exchanger according to claim 14, wherein the cross-sectional shape of the tank body has a pair of mutually opposing sidewalls, and a bottom that joins the pair of sidewalls by being connected to the pair of sidewalls through connections curved at a prescribed radius of curvature, and the shape factor S/RT of the tank body, when the radius of curvature of the portion through which the fluid circulates, the plate thickness and the cross-sectional area of the flow path are taken to be R, T and S, respectively, is 110 or less.

* * * * *

UNITED STATES PATENT AND TRADEMARK OFFICE
CERTIFICATE OF CORRECTION

PATENT NO.        : 8,474,518 B2                                                  Page 1 of 1
APPLICATION NO. : 12/531435
DATED             : July 2, 2013
INVENTOR(S)       : Goto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 921 days.

Signed and Sealed this
Eighth Day of September, 2015

Michelle K. Lee
*Director of the United States Patent and Trademark Office*